(12) United States Patent
Yang et al.

(10) Patent No.: US 12,160,848 B2
(45) Date of Patent: Dec. 3, 2024

(54) ACCESS CONTROL METHOD, TERMINAL, AND STORAGE MEDIUM

(71) Applicant: GUANGDONG OPPO MOBILE TELECOMMUNICATIONS CORP., LTD., Guangdong (CN)

(72) Inventors: Ning Yang, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 447 days.

(21) Appl. No.: 17/231,626

(22) Filed: Apr. 15, 2021

(65) Prior Publication Data

US 2021/0235423 A1 Jul. 29, 2021

Related U.S. Application Data

(63) Continuation of application No. PCT/CN2018/112232, filed on Oct. 26, 2018.

(51) Int. Cl.
*H04W 72/02* (2009.01)
*H04W 48/02* (2009.01)
*H04W 72/0446* (2023.01)
*H04W 76/23* (2018.01)
*H04W 84/04* (2009.01)

(52) U.S. Cl.
CPC ........... *H04W 72/02* (2013.01); *H04W 48/02* (2013.01); *H04W 72/0446* (2013.01); *H04W 76/23* (2018.02); *H04W 84/042* (2013.01)

(58) Field of Classification Search
CPC . H04W 72/02; H04W 72/0446; H04W 48/02; H04W 48/08; H04W 76/14; H04W 76/23; H04W 84/042
See application file for complete search history.

(56) References Cited

U.S. PATENT DOCUMENTS

| | | | | |
|---|---|---|---|---|
| 10,225,877 B2* | 3/2019 | Wakabayashi | ........ | H04W 76/11 |
| 10,383,089 B2* | 8/2019 | Seo | ........ | H04W 72/02 |
| 10,506,575 B2* | 12/2019 | Lei | ........ | H04W 72/23 |
| 10,674,479 B2* | 6/2020 | Sorrentino | ........ | H04W 24/08 |
| 10,966,079 B2* | 3/2021 | Xu | ........ | H04W 8/005 |
| 10,985,857 B2* | 4/2021 | Hua | ........ | H04J 11/005 |
| 11,019,631 B2* | 5/2021 | Seo | ........ | H04W 72/02 |

(Continued)

FOREIGN PATENT DOCUMENTS

| | | |
|---|---|---|
| CN | 106416405 | 2/2017 |
| CN | 108141847 | 6/2018 |

(Continued)

OTHER PUBLICATIONS

Alcatel-Lucent et al., "Priority handling for ProSE Communication," 3GPP TSG-RAN WG2 Meeting #91, R2-153628, Aug. 2015, 4 pages.

(Continued)

*Primary Examiner* — Siu M Lee
(74) *Attorney, Agent, or Firm* — Hodgson Russ LLP

(57) ABSTRACT

Disclosed are an access method, a terminal, and a storage medium. The method comprises: a terminal determines, according to the configured resource or resource pool, and a restriction parameter corresponding to the resource or the resource pool, a direct link resource.

12 Claims, 2 Drawing Sheets

A terminal determines a direct link resource according to a configured resource or resource pool and a restriction parameter corresponding to the resource or resource pool ⟋201

(56) References Cited

U.S. PATENT DOCUMENTS

| | | | |
|---|---|---|---|
| 11,516,820 B2* | 11/2022 | Zhao | H04W 28/02 |
| 11,540,291 B2* | 12/2022 | Feng | H04W 74/0816 |
| 2017/0142741 A1 | 5/2017 | Kaur et al. | |
| 2018/0092065 A1* | 3/2018 | Sheng | H04W 74/006 |
| 2018/0227882 A1* | 8/2018 | Freda | H04W 8/005 |
| 2019/0053251 A1* | 2/2019 | Loehr | H04W 72/1263 |
| 2019/0246376 A1 | 8/2019 | Tang et al. | |
| 2020/0068593 A1* | 2/2020 | Seo | H04W 76/14 |
| 2021/0168826 A1* | 6/2021 | Zhao | H04L 5/0044 |

FOREIGN PATENT DOCUMENTS

| | | |
|---|---|---|
| WO | 2017137231 | 8/2017 |
| WO | 2017197122 | 11/2017 |
| WO | 2018058438 | 4/2018 |

OTHER PUBLICATIONS

EPO, Extended European Search Report for EP Application No. 18937671.8, Oct. 21, 2021.
WIPO, International Search Report and Written Opinion for PCT/CN2018/112232, Jun. 6, 2019.
Huawei et al., "Inter-PLMN operation on PC5," 3GPP TSG RAN WG1 Meeting #88, R1-1703058, Feb. 2017.
EPO, Communication for EP Application No. 18937671.8, Sep. 26, 2023.

* cited by examiner

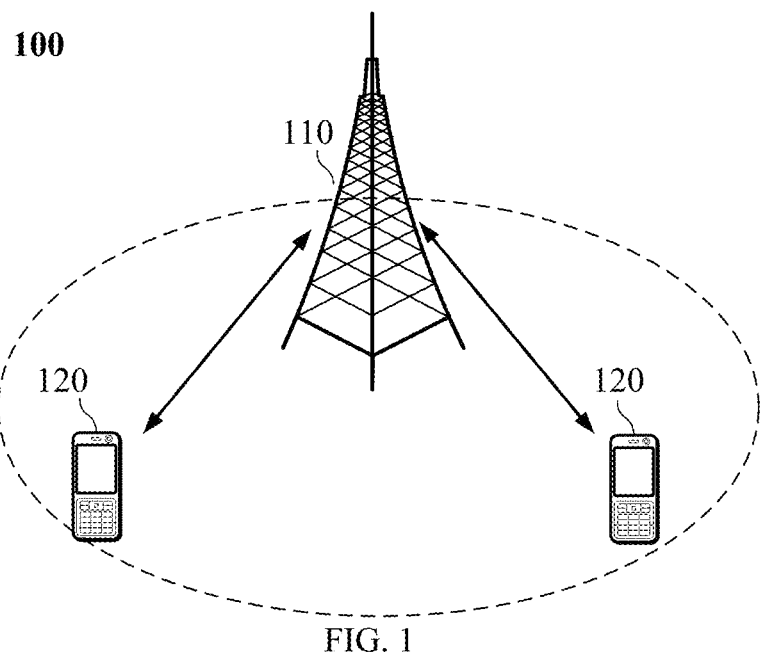
FIG. 1
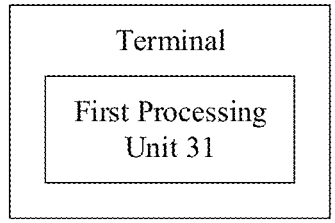
FIG. 2
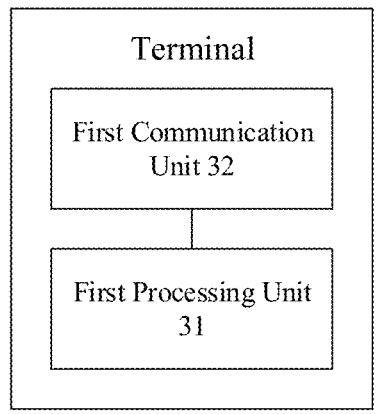
FIG. 3
FIG. 4

ACCESS CONTROL METHOD, TERMINAL, AND STORAGE MEDIUM

CROSS-REFERENCE

This application is a continuation of International Application No. PCT/CN2018/112232, filed on Oct. 26, 2018, the entire disclosure of which is incorporated herein by reference.

TECHNICAL FIELD

The present application relates to the field of wireless communication technologies, and in particular to an access control method, a terminal and a storage medium.

BACKGROUND

In a wireless communication system, there are two ways for a network side to configure resources for device-to-device terminals, a first way of full control by the network, and a second way of partial control by the network. In the second way, when the terminal requires data transmission resources, the terminal will use the resources in the resource pool sent by the network side for data transmission, but in this method, it cannot control for what service requirements the terminal uses the resources in the resource pool, and as to how to allocate resources reasonably when the resources are strained, for example, there is currently no effective solution.

SUMMARY

Embodiments of the present application provide an access control method, a terminal, and a storage medium.

An access control method according to the embodiments of the present application includes: determining, by a terminal based on a configured resource or resource pool and a restriction parameter corresponding to the resource or resource pool, a direct link resource.

A terminal according to the embodiments of the present application includes a first processing unit configured to determine a direct link resource based on a configured resource or resource pool and a restriction parameter corresponding to the resource or resource pool.

A terminal according to the embodiments of the present application includes a processor and a memory. The memory is used for storing a computer program, and the processor is configured to call and run the computer program stored in the memory to perform the access control method as described above.

A chip according to the embodiments of the present application is configured to implement the access control method as described above.

Specifically, the chip includes a processor configured to call and run a computer program from a memory to cause a device installed with the chip to perform the access control method as described above.

A computer-readable storage medium according to the embodiments of the present application is used to store a computer program that causes a computer to perform the access control method as described above.

A computer program product according to the embodiments of the present application includes computer program instructions that cause a computer to perform the access control method as described above.

A computer program according to the embodiments of the present application, when running on a computer, causes the computer to perform the access control method as described above.

BRIEF DESCRIPTION OF THE DRAWINGS

The drawings described here are used to provide a further understanding of the present application and constitute a part of the present application. The exemplary embodiments and descriptions of the present application are used to explain the present application, and do not constitute an improper limitation of the present application. In the drawings:

FIG. 1 is a schematic diagram of a communication system architecture according to an embodiment of the present application;

FIG. 2 is a schematic flowchart of an access control method according to an embodiment of the present application;

FIG. 3 is a schematic diagram of a structural composition of a terminal according to an embodiment of the present application;

FIG. 4 is a schematic diagram of another composition structure of a terminal according to an embodiment of the present application;

DETAILED DESCRIPTION

Figure 5:
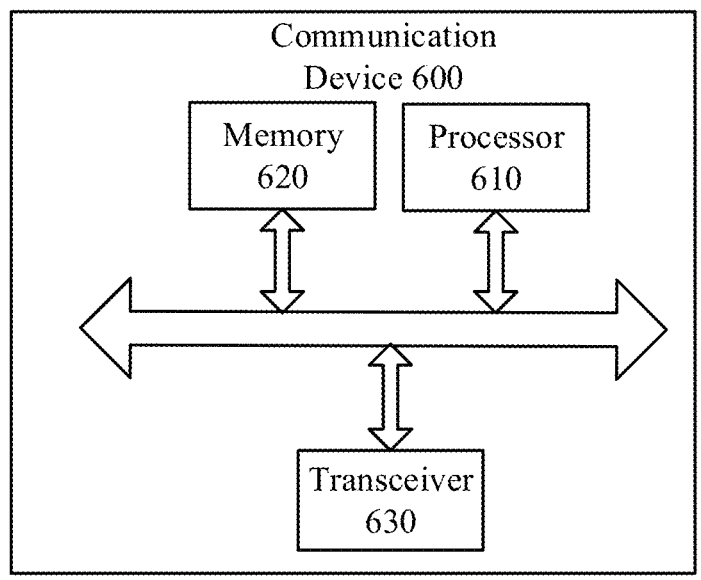
FIG. 5 is a schematic structural diagram of a communication device according to an embodiment of the present application.

The technical solutions in the embodiments of the present application will be described below in conjunction with the drawings in the embodiments of the present application. Obviously, the described embodiments are part of the embodiments of the present application, but not all the embodiments. Based on the embodiments in the present application, all other embodiments obtained by those of ordinary skill in the art without creative work fall within the protection scope of the present application.

The technical solutions of the embodiments of the present application can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

For example, a communication system to which the embodiments of the present disclosure are applied is as shown in FIG. 1. The communication system 100 may include a network device 110 which may be a device that communicates with a terminal 120 (or referred to as a communication terminal or a terminal). The network device 110 can provide communication coverage for a specific geographic area, and can communicate with terminals located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Alternatively, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one terminal 120 located within the coverage range of the network device 110. As used herein, the terminal includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/ network; and/or via a wireless interface, such as cellular networks, wireless local area networks (WLAN), digital TV networks such as DVB-H networks, satellite networks, AM-FM broadcast transmitter. A terminal configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDAs that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminals in 5G networks, terminals in the future evolution of PLMN, or the like.

In the embodiments of the present application, Device to Device (D2D) communication can be performed between the terminals 120.

Optionally, the technical solutions of the embodiments of the present application may also be applied to an Internet of Vehicles system, and the data transmission in the Internet of Vehicles system may be performed based on the aforementioned communication network.

Optionally, a 5G system or 5G network in the embodiments of the present application may also be referred to as a New Radio (NR) system or NR network.

FIG. 1 exemplarily shows one network device and two terminals. Optionally, the communication system 100 may include multiple network devices and other number of terminals can be included in the coverage of each network device, which are not particularly limited in the embodiments of the present disclosure.

Optionally, the communication system 100 may also include other network entities such as a network controller and a mobility management entity, which are not limited in the embodiments of the present application.

It should be understood that the device with a communication function in the network and/or system of the embodiments of the present disclosure may be referred to as the communication device. Taking the communication system 100 shown in FIG. 1 as an example, the communication device may include a network device 110 and terminals 120 which have the communication function. The network device 110 and the terminals 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

The embodiments of the present application provide an access control method. FIG. 2 is a schematic flow chart of an access control method according to an embodiment of the present application. As shown in FIG. 2, the method includes the following steps.

In step 201, a terminal determines a direct link resource according to a configured resource or resource pool and a restriction parameter corresponding to the resource or resource pool.

In this embodiment, the resource or resource pool and/or the restriction parameter corresponding to the resource or resource pool are configured by the network device, or are pre-configured by the terminal, and the terminal determines the direct link resource according to the resource or resource pool and the restriction parameter corresponding to the resources or resource pool configured by the network device, determines the direct link resource according to the pre-configured resource or resource pool and restriction parameter corresponding to the resource or resource pool, determines the direct link resource according to the resource or resource pool configured by the network device and the pre-configured restriction parameter corresponding to the resource or resource pool; or determines the direct link resource according to the pre-configured resource or resource pool and the restriction parameter corresponding to the resource or resource pool configured by the network device.

The resource in this embodiment includes sending resources and/or receiving resources, and the resource include time domain resources and frequency domain resources. The resource pool can include a plurality of resources.

The resource described in this embodiment is used for the direct link, which is a terminal-to-terminal link. It can be understood that the direct link resource is a resource for data transmission between the terminal and other terminals, and the direct link resource includes a direct link transmission resource (for data transmission) and/or a direct link reception resource (for data reception).

It can be understood that the terminal pre-configures the resource or resource pool and/or the restriction parameter corresponding to the resource or resource pool, or receives the resource or resource pool and/or the restriction parameter corresponding to the resource or resource pool configured by the network device, and the terminal determines the direct link resource according to the resource or resource pool and the restriction parameter corresponding to the resource or resource pool.

In an optional embodiment of the present application, if the restriction parameter corresponding to the resource or resource pool is configured by the network device, the method further includes: obtaining, by the terminal, the restriction parameter configured by the network device through broadcast signaling, or obtaining, by the terminal, the restriction parameter configured by the network device through dedicated signaling.

As an example, the broadcast signaling is system information. As an example, the dedicated signaling may be Radio Resource Control (RRC) reconfiguration information or RRC release signaling, and so on.

In an optional embodiment of the present application, the restriction parameter includes at least one of the following: a service category or Access Category (AC); a Public Land Mobile Network (PLMN); a scene parameter; and a resource usage restriction parameter.

Optionally, the scene parameter includes a terminal connection state and/or a terminal control mode.

Here, the terminal connection state includes at least one of the following: an idle state (IDLE), an inactive state (INACTIVE), and a connected state (CONNECTED). It can be understood that if the restriction parameter includes the terminal connection state, it indicates that the restriction parameter is applicable when the terminal is in the corresponding connection state.

Here, the terminal control mode includes a network full control mode and a network partial control mode.

The network full control mode (can be referred to as mode1) indicates that when the terminal requires resources for data transmission, the terminal establishes a connection with the network device, the network allocates corresponding resources to the terminal, and the terminal performs the data transmission according to the resources allocated by the network device. The network partial control mode (can be referred to as mode2) indicates that the network device allocates a resource pool for the terminal, and when the terminal requires resources for data transmission, the terminal selects the required resources from the resource pool for data transmission.

Optionally, the resource usage restriction parameter includes at least one of the following: a resource usage time restriction parameter, a resource usage probability restriction parameter, and a resource usage size restriction parameter.

In an optional embodiment of the present application, there may be at least one resource or resource pool configured in the terminal, and the restriction parameters corresponding to different resources or resource pools are the same or different, where the restriction parameters corresponding to the resources or resource pools being different indicates that each parameter of the restriction parameters is different, for example, the restriction parameter include the service category, PLMN, and the usage probability restriction parameter, one of the resource pools corresponds to the service category a1, PLMN1 and the usage probability restriction parameter b1, and another one of the resource pools corresponds to the service category a2, PLMN2 and the usage probability restriction parameter b2; or that parts of the restriction parameters are different and parts of them are the same, for example, the restriction parameter includes the service category, PLMN, and the usage probability restriction parameter, one of the resource pools corresponds to the service category a1, PLMN1, and the usage probability restriction parameter b1, and another resource pool corresponds to the service category a1, PLMN1, and the usage probability restriction parameter b2.

In an optional embodiment of the present application, determining the direct link resource by the terminal according to the resource or resource pool and the restriction parameter corresponding to the resource or resource pool configured by the network device includes: determining, by the terminal according to the restriction parameter, whether the terminal can use the resource or resource pool corresponding to the restriction parameter, and determining, by the terminal, the direct link resource from the resource or resource pool when a determination result is that the terminal can use the resource or resource pool corresponding to the restriction parameter.

As to how to determine that the direct link resource can be determined, it may include at least one of the following manners.

As a first implementation manner, determining by the terminal according to the restriction parameter whether the terminal can use the resource or resource pool corresponding to the restriction parameter includes: the terminal randomly obtains a first numerical value, compares the first numerical value with the resource usage probability restriction parameter in the restriction parameter, determines that the resource or resource pool corresponding to the restriction parameter can be used when a comparison result meets a preset condition, and determines that the resource or resource pool corresponding to the restriction parameter cannot be used when the comparison result does not meet the preset condition.

The first numerical value is greater than or equal to 0 and less than or equal to 1. Whether the comparison result meets the preset condition can be determined in the following method: when the first numerical value is greater than or equal to the resource usage probability restriction parameter, it is determined that the comparison result meets the preset condition, and when the first numerical value is less than the resource usage probability restriction parameter, it is determined that the comparison result does not meet the preset condition. Of course, the opposite is also possible, when the first numerical value is less than the resource usage probability restriction parameter, it is determined that the comparison result meets the preset condition, and when the first numerical value is greater than or equal to the resource usage probability restriction parameter, it is determined that the comparison result does not meet the preset condition.

Alternatively, in another embodiment, whether the comparison result meets the preset condition can be determined in the following method: a preset operation process is performed on the first numerical value, the processing result is compared with the resource usage probability restriction parameter, and it is determined whether the preset condition is met or not according to the comparison result. The preset operation process includes at least one processing method of four fundamental operations of mathematics.

As a second implementation manner, determining by the terminal according to the restriction parameter whether the terminal can use the resource or resource pool corresponding to the restriction parameter includes: the terminal determines whether the service category or access category of data to be transmitted matches the service category or access category in the configured resource or resource pool and restriction parameter corresponding to the resource or resource pool, if they match, the terminal determines that the terminal can use the resource or resource pool corresponding to the restriction parameter, and if not, the terminal determines that the terminal cannot use the resource or resource pool corresponding to the restriction parameter.

As a third implementation manner, determining by the terminal according to the restriction parameter whether the terminal can use the resource or resource pool includes: the terminal determines whether a PLMN to which the terminal belongs matches the PLMN in the configured resource or resource pool and the restriction parameter corresponding to the resource or resource pool, if they match, the terminal determines that the terminal can use the resource or resource pool corresponding to the restriction parameter, and if not, the terminal determines that the terminal cannot use the resource or resource pool corresponding to the restriction parameter.

Of course, any combination of the above three implementation manners can be used to determine whether the direct link resource can be determined in the embodiments of the present application.

In an optional embodiment of the present application, determining the direct link resource from the resource or resource pool by the terminal includes: when the terminal can use the resource pool corresponding to the restriction parameter, the terminal randomly selects a first resource from the resource pool, as the direct link resource.

It can be understood that, as an implementation manner, when the terminal determines that the resource or resource pool corresponding to the restriction parameter can be used, that is, when the PLMN to which the terminal belongs matches the PLMN in the restriction parameter, the terminal uses the resource or resource pool corresponding to the PLMN, and/or when the service type or access type of the terminal matches the service type or access type in the restriction parameter, the terminal uses the resource or resource pool corresponding to the service type or access type. When the resource pool includes a plurality of resources, the terminal can randomly select the first resource from the resource pool as the direct link resource in a random manner. The number of the first resource selected is at least one.

In an optional embodiment of the present application, the method further includes: determining that data transmission is restricted when the terminal determines that the resource or resource pool corresponding to the restriction parameter cannot be used according to the restriction parameter. As for the specific implementations of determining that the resource or resource pool cannot be used, reference can be made to the above, which will not be repeated here.

In an optional embodiment of the present application, after the terminal determines that the resource or resource pool corresponding to the restriction parameter cannot be used, especially after determining based on the resource usage probability restriction parameter that the corresponding resource or resource pool cannot be used, the method further includes: the terminal randomly obtains a second numerical value, and determines a restricted usage time duration of the resource or resource pool based on the second numerical value and the resource usage time restriction parameter in the restriction parameter.

In this embodiment, the second numerical value is greater than or equal to 0 and less than or equal to 1. As an implementation manner, determining the restricted usage time duration of the resource or resource pool based on the second numerical value and the resource usage time restriction parameter in the restriction parameter includes: the terminal determines the restricted usage time duration of the resource or resource pool based on a product of the second numerical value and the resource usage time restriction parameter. For example, the terminal randomly obtains a second numerical value of 0.7, the resource usage time restriction parameter is a time length Timer, and the restricted usage time duration of the resource or resource pool can be obtained through 0.7*Timer.

As another implementation manner, determining the restricted usage time duration of the resource or resource pool based on the second numerical value and the resource usage time restriction parameter in the restriction parameter includes: the terminal performs a preset operation processing on the second numerical value, and determines the restricted usage time duration of the resource or resource pool based on the product of the processing result and the resource usage time restriction parameter. For example, the terminal randomly obtains the second numerical value as rand, performs an operation of (0.7+0.6*rand) on the second numerical value, where 0.7 and 0.6 are both pre-configured values, the resource usage time restriction parameter is a time length Timer, and the restricted usage time duration of the resource or resource pool can be obtained through (0.7+0.6*rand)*Timer.

In an optional embodiment of the present application, determining the direct link resource by the terminal according to the configured resource or resource pool and restriction parameter corresponding to the resource or resource pool includes: the terminal randomly obtains a third numerical value, determines a number of available resources in the resource or resource pool corresponding to the restriction parameter based on the third numerical value and the resource usage size restriction parameter in the restriction parameter, and determines from the resource or resource pool the resource that meets the number of available resources, as the direct link resource.

In this embodiment, the third numerical value is greater than or equal to 0 and less than or equal to 1. Determining the number of available resources in the resource pool corresponding to the restriction parameter based on the third numerical value and the resource usage size restriction parameter in the restriction parameter includes: the terminal determines the number of available resources in the resource pool corresponding to the restriction parameter based on a product of the third numerical value and the resource usage size restriction parameter. Further, the resources that satisfy the number of available resources are selected from the resource pool as the direct link resource. For example, the terminal randomly obtains a third numerical value of 0.2, which can also be represented as 20% and may indicate that the available resources available to the terminal account for 20% of the total resources, and the terminal can determine the direct link resource from these 20% resources. The resource usage size restriction parameter is a quantity Q of resources in the corresponding resource pool, and the quantity of available resources in the resource pool can be obtained by 0.2*Q. For another example, the terminal randomly obtains a third numerical value of 70%, and the resource usage size restriction parameter is also the quantity Q of the corresponding resources, then the quantity of available resources in the resource pool can be obtained by 0.7*Q, that is, the terminal can determine the direct link resource from the 70% of resources. Compared to the first example, the probability of successfully obtaining the direct link resource is greatly increased in the second example.

The access control method according to the embodiments of the present application will be described in detail below with reference to specific embodiments.

When a non-access stratum (NAS) of the terminal triggers the terminal to use the direct link resources configured by the network device for a certain service, the NAS needs to notify an access stratum (AS) of the corresponding service category or access category, and the AS of the terminal obtains the restriction parameter corresponding to the resource pool configured by the network device through the PLMN corresponding to the service, and the service category or access category corresponding to the service.

When there is no restriction parameter corresponding to the resource pool, indicating that the resource usage is not restricted currently and the terminal can randomly select resources in the resource pool for data transmission, the terminal randomly selects resources from the resource pool for data transmission;

when there is restriction parameter corresponding to the resource pool, it indicates that the terminal needs to select resources in the resource pool for data transmission according to the restriction parameter; and if the terminal cannot select the resource according to the restriction parameter, the NAS is notified that the data transmission is restricted currently, indicating that the terminal will not or cannot select the resource or is prohibited from selecting the resource for data transmission.

Optionally, when the restriction parameter corresponding to the resource pool includes the PLMN and one of the service category and access category, the service category or access category of the terminal matches the service category or access category in the restriction parameter corresponding to a certain resource pool, and the PLMN of the terminal matches the PLMN in the restriction parameter, the terminal selects the first numerical value between 0 and 1 in a random manner. If the first numerical value is greater than the resource usage probability restriction parameter in the restriction parameter, it indicates that the resource usage is restricted currently, and if the first numerical value is less than or equal to the resource usage probability restriction parameter in the restriction parameter, it indicates that the resource usage is not restricted currently, and resources can be selected from the resource pool.

Optionally, after the data transmission is restricted, the terminal may select the second numerical value between 0 and 1 in a random manner, and calculate the restricted usage time of the resources based on the second numerical value. For example, the terminal randomly obtains the second numerical value of 0.7, the resource usage time restriction parameter is a time length Timer, and the restricted usage time duration of the resource or resource pool can be obtained through 0.7*Timer.

Optionally, if the terminal determines that the data transmission is not restricted, indicating that the terminal can use the corresponding resource pool, the terminal can select the third numerical value between 0 and 1 in a random manner, and the third numerical value can represent maximum resources in the resource pool that the terminal can use for the current data transmission, such as 20%, 30%, or 50%. Assuming that the third numerical value randomly obtained by the terminal is 0.2, which can also be represented as 20%, it can indicate that the available resources available for the terminal account for 20% of the total resources. The resource usage size restriction parameter is a quantity Q of resources in the corresponding resource pool, then the quantity of available resources in the resource pool can be obtained through 0.2*Q.

With the technical solutions according to the embodiments of the present application, in a scenario where the resources or resource pools configured for different terminals are the same, if the number of terminals is greater than the number of resources and thus when the terminals require the resources for data transmission, one resource may be selected by more than one terminals, that is, in a strained resource scenario, the terminal determines the direct link resource through the restriction parameter corresponding to the configured resources or the resource pool, so that different terminals can use the resources in the same resource pool for direct link data transmission in an orderly manner. On the other hand, it also avoids the situations where the data transmission is delayed or even the data is not transmitted for certain services with high delay requirements due to the strained resources.

The embodiments of the present application also provides a terminal. FIG. 3 is a schematic diagram of a structural composition of a terminal according to an embodiment of the present application. As shown in FIG. 3, the terminal includes a first processing unit 31 configured to determine a direct link resource according to a configured resource or resource pool and a restriction parameter corresponding to the resource or resource pool.

In an optional embodiment of the present application, the restriction parameter includes at least one of the following: a service category or access category; a PLMN; a scene parameter; and a resource usage restriction parameter.

In an optional embodiment of the present application, the scene parameter includes a terminal connection state and/or a terminal control mode.

In an optional embodiment of the present application, the terminal connection state includes at least one of the following: an idle state, an inactive state, and a connected state.

In an optional embodiment of the present application, the terminal control mode includes a network full control mode and a network partial control mode.

In an optional embodiment of the present application, the resource usage restriction parameter includes at least one of the following: a resource usage time restriction parameter, a resource usage probability restriction parameter, and a resource usage size restriction parameter.

In an optional embodiment of the present application, the restriction parameters corresponding to different resources or resource pools are the same or different.

In an optional embodiment of the present application, as shown in FIG. 4, the terminal further includes a first communication unit 32 configured to obtain the restriction parameter configured by the network device through broadcast signaling or through dedicated signaling.

In an optional embodiment of the present application, the first processing unit 31 is configured to determine according to the restriction parameter whether the terminal is configured to use the resource or resource pool corresponding to the restriction parameter, and to determine the direct link resource from the resource or resource pool when it is determined that the terminal is configured to use the resource or resource pool corresponding to the restriction parameter.

In an optional embodiment of the present application, the first processing unit 31 is configured to randomly obtain a first numerical value, compare the first numerical value with the resource usage probability restriction parameter in the restriction parameter, determine that the resource or resource pool corresponding to the restriction parameter can be used when the comparison result meets a preset condition, and determine that the resource or resource pool corresponding to the restriction parameter cannot be used when the comparison result does not meet the preset condition.

In an optional embodiment of the present application, the first processing unit 31 is configured to determine whether a service category or access category of data to be transmitted matches the service category or access category in the configured resources or resource pool and restriction parameter corresponding to the resources or resource pool; determine that the resource or resource pool corresponding to the restriction parameter can be used if they match, and determine that the resource or resource pool corresponding to the restriction parameter cannot be used if they do not match.

In an optional embodiment of the present application, the first processing unit 31 is configured to determine whether a PLMN thereof matches the PLMN in the configured resource or resource pool and restriction parameter corresponding to the resource or resource pool; determine that the resource or resource pool corresponding to the restriction parameter can be used if they match, and determine that the resource or resource pool corresponding to the restriction parameter cannot be used if they do not match.

In an optional embodiment of the present application, the first processing unit 31 is configured to randomly select a first resource from the resource pool as the direct link resource after determining that the resource pool corresponding to the restriction parameter can be used.

In an optional embodiment of the present application, the first processing unit 31 is further configured to determine that data transmission is restricted when it is determined that the resource or resource pool corresponding to the restriction parameter cannot be used according to the restriction parameter.

In an optional embodiment of the present application, the first processing unit 31 is further configured to obtain a second numerical value randomly, and determine a restricted usage time duration of the resource or resource pool based on the second numerical value and the resource usage time restriction parameter in the restriction parameter.

In an optional embodiment of the present application, the first processing unit 31 is further configured to randomly obtain a third numerical value, determine a number of available resources in the resource or resource pool corresponding to the restriction parameter based on the third value and the resource usage size restriction parameter in the restriction parameter, and determine from the resource or resource pool the resource that satisfies the number of available resources, as the direct link resource.

It should be noted that for the terminal performing the access control according to the above embodiments, the division of the above program modules is used only as an example for illustration. In actual applications, the above processing can be allocated to be performed by different program modules according to requirements, that is, the internal structure of the terminal is divided into different program modules to complete all or part of the processing described above. In addition, the terminal and the access control method according to the foregoing embodiments belong to the same concept, and the specific implementation process is detailed in the method embodiments, which will not be repeated here.

The embodiments of the present application also provide an access control method, and the method includes: a network device determines a restriction parameter corresponding to a resource or resource pool, and sends the restriction parameter corresponding to the resource or resource pool to a terminal.

The relevant explanation of the restriction parameter can refer to the relevant explanation in the aforementioned access control method applied to the terminal, which will not be repeated here.

Optionally, sending the restriction parameter to the terminal includes: the network device sends the restriction parameter to the terminal through broadcast signaling, or the network device sends the restriction parameter to the terminal through dedicated signaling.

As an example, the broadcast signaling is system information. As an example, the dedicated signaling may be RRC reconfiguration information, RRC release signaling, or the like.

The embodiments of the present application also provides a network device, the network device includes a second processing unit and a second communication unit; the second processing unit is configured to determine a restriction parameter corresponding to a resource or resource pool, and the second communication unit is configured to send the restriction parameter corresponding to the resource or resource pool to a terminal.

The embodiments of the present application also provides a communication system, the communication system includes a terminal and a network device; the terminal can be configured to implement the corresponding functions implemented by the terminal in the above method, and the network device can be configured to implement the corresponding functions implemented by the network device in the above method, which will not be repeated here for the sake of brevity.

FIG. 5 is a schematic structural diagram of a communication device according to an embodiment of the present application. The communication device can be a terminal. The communication device shown in FIG. 5 includes a processor 610 which can invoke and execute a computer program from a memory to carry out the methods in the embodiments of the present application.

Optionally, as shown in FIG. 5, the communication device can further include a memory 620. The processor 610 can invoke and run the computer program from the memory 620 to carry out the methods in the embodiments of the present application.

The memory 620 can be a separate device independent of the processor 610, or can be integrated in the processor 610.

Optionally, as shown in FIG. 5, the communication device can further include a transceiver 630, and the processor 610 can control the transceiver 630 to communicate with other devices, and specifically to transmit information or data to other devices, or receive information or data transmitted from other devices.

The transceiver 630 can include a transmitter and a receiver. The transceiver 630 can further include one or more antennas.

Optionally, the communication device can specifically be a network device in the embodiments of the present application, and the communication device can carry out the corresponding processes which are implemented by the network device in the methods of the embodiments of the present application, which will not be repeated here for the sake of brevity.

Optionally, the communication device can specifically be a mobile terminal/terminal in the embodiments of the present application, and the communication device can implement the corresponding processes which are implemented by the terminal in the methods according to the embodiments of the present application, which will not be repeated here for the sake of brevity.

Figure 6:
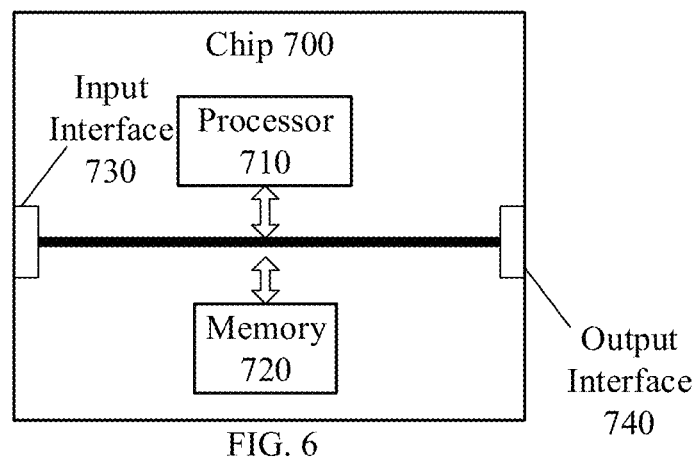
FIG. 6 is a schematic structural diagram of a chip according to an embodiment of the present application.

FIG. 6 is a schematic structural diagram of a chip according to an embodiment of the present application. The chip 700 shown in FIG. 6 includes a processor 710 which can invoke and run a computer program from a memory to carry out the methods in the embodiments of the present application.

Optionally, as shown in FIG. 6, the chip 700 can further include a memory 720. The processor 710 can invoke and run the computer program from the memory 720 to carry out the methods in the embodiments of the present application.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the network device in the embodiments of the present application, and the chip can carry out the corresponding processes which are implemented by the network device in the methods of the embodiments of the present application, which will not be repeated here for the sake of brevity.

Optionally, the chip can be applied to the terminal in the embodiments of the present application, and the chip can carry out the corresponding processes which are implemented by the terminal in the methods of the embodiments of the present application, which will not be repeated here for the sake of brevity.

It should be understood that the chip mentioned in the embodiments of the present application can also be referred to as a system-level chip, a system chip, a chip system, or a system-on-chip.

It should be understood that the processor according to the embodiments of the present application can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present application may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present application, and the computer program causes a computer to perform the corresponding processes which are implemented by the network device in the methods of the embodiments of the present application, which will not be repeated here for the sake of brevity.

Optionally, the computer-readable storage medium can be applied to the terminal in the embodiments of the present application, and the computer program causes the computer to perform the corresponding processes which are implemented by the terminal in the methods of the embodiments of the present application, which will not be repeated here for the sake of brevity.

The embodiments of the present application also provide a computer program product including computer program instructions.

Optionally, the computer program product can be applied to the network device in the embodiments of the present application, and the computer program instructions cause a computer to perform the corresponding processes implemented by the network device in the methods of the embodiments of the present application, which will not be repeated here for the sake of brevity.

Optionally, the computer program product can be applied to the terminal in the embodiments of the present application, and the computer program instructions cause a computer to perform the corresponding processes which are implemented by the terminal in the methods of the embodiments of the present application, which will not be repeated here for the sake of brevity.

The embodiments of the present application also provide a computer program.

Optionally, the computer program can be applied to the network device in the embodiments of the present application, and when running on a computer, the computer program causes the computer to perform the corresponding process implemented by the network device in the methods of the embodiments of the present application, which will not be repeated here for the sake of brevity.

Optionally, the computer program can be applied to the mobile terminal/terminal in the embodiments of the present application, and when running on a computer, causes the computer to perform the corresponding process implemented by the terminal in the methods of the embodiments of the present application, which will not be repeated here for the sake brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

It should be understood that the devices and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. An access control method, comprising:
   obtaining, by a terminal, a restriction parameter corresponding to a configured resource or resource pool, the restriction parameter being configured by a network device or pre-configured by the terminal;
   determining, by the terminal according to the restriction parameter, whether the terminal is configured to use the resource or resource pool corresponding to the restriction parameter; and
   in response to determining that the terminal is configured to use the resource or resource pool, selecting, by the terminal from the resource or resource pool corresponding to the restriction parameter, a direct link resource;
   wherein the restriction parameter comprises at least one of:
      an access category;
      a Public Land Mobile Network (PLMN);
      a scene parameter; and
      a resource usage restriction parameter; and
   wherein the determining, by the terminal according to the restriction parameter, whether the terminal is configured to use the resource or resource pool corresponding to the restriction parameter comprises:
      determining, by the terminal, whether an access category of data to be transmitted matches the access category in the configured resource or resource pool and the restriction parameter corresponding to the resource or resource pool;
      determining, by the terminal when a determination result is a match, that the terminal is configured to use the resource or resource pool corresponding to the restriction parameter; and
      determining, by the terminal when the determination result is not a match, that the terminal is not configured to use the resource or resource pool corresponding to the restriction parameter;
   or
   wherein the determining, by the terminal according to the restriction parameter, whether the terminal is configured to use the resource or resource pool corresponding to the restriction parameter comprises:
      determining, by the terminal, whether a PLMN to which the terminal belongs matches the PLMN in the configured resource or resource pool and the restriction parameter corresponding to the resource or resource pool;
      determining, by the terminal when a determination result is a match, that the terminal is configured to use the resource or resource pool corresponding to the restriction parameter; and
      determining, by the terminal when the determination result is not a match, that the terminal is not configured to use the resource or resource pool corresponding to the restriction parameter.

2. The method according to claim 1,
   wherein the scene parameter comprises at least one of a terminal connection state and a terminal control mode,
   wherein the terminal connection state comprises at least one of an idle state, an inactive state, and a connected state, wherein the terminal control mode comprises a network full control mode and a network partial control mode, or wherein the resource usage restriction parameter comprises at least one of a resource usage time restriction parameter, a resource usage probability restriction parameter, and a resource usage size restriction parameter.

3. The method according to claim 1, wherein the restriction parameters corresponding to different resources or resource pools are the same or different.

4. The method according to claim 1, further comprising:
obtaining, by the terminal through broadcast signaling, the restriction parameter configured by the network device; or
obtaining, by the terminal through dedicated signaling, the restriction parameter configured by the network device.

5. The method according to claim 1, wherein the determining, by the terminal according to the restriction parameter, whether the terminal is configured to use the resource or resource pool corresponding to the restriction parameter comprises:
randomly obtaining, by the terminal, a first numerical value, and comparing, by the terminal, the first numerical value with a resource usage probability restriction parameter in the restriction parameter;
determining by the terminal that the terminal is configured to use the resource or resource pool corresponding to the restriction parameter when a comparison result meets a preset condition; and
determining by the terminal that the terminal is not configured to use the resource or resource pool corresponding to the restriction parameter when the comparison result does not meet the preset condition.

6. The method according to claim 1, wherein the determining, by the terminal from the resource or resource pool, the direct link resource comprises:
randomly selecting, by the terminal, a first resource from the resource pool corresponding to the restriction parameter as the direct link resource when it is determined that the terminal is configured to use the resource pool, or
wherein the method further comprises: determining data transmission is restricted when the terminal determines according to the restriction parameter that the terminal is not configured to use the resource or resource pool corresponding to the restriction parameter.

7. The method according to claim 5, further comprising:
randomly obtaining a second numerical value by the terminal and determining by the terminal a restricted usage time duration of the resource or resource pool based on the second numerical value and a resource usage time restriction parameter in the restriction parameter.

8. A terminal, comprising:
a processor; and
a memory for storing a computer program,
wherein the processor is configured to:
obtain a restriction parameter corresponding to a configured resource or resource pool, the restriction parameter being configured by a network device or pre-configured by the terminal;
determine, according to the restriction parameter, whether the terminal is configured to use the resource or resource pool corresponding to the restriction parameter; and in response to determining that the terminal is configured to use the resource or resource pool, select a direct link resource from the resource or resource pool corresponding to the restriction parameter;
wherein the restriction parameter comprises at least one of:
an access category;
a Public Land Mobile Network (PLMN);
a scene parameter; and
a resource usage restriction parameter, and
wherein the processor is configured to determine whether an access category of data to be transmitted matches the access category in the configured resource or resource pool and restriction parameter corresponding to the resource or resource pool; determine that the terminal is configured to use the resource or resource pool corresponding to the restriction parameter when a determination result is a match, and determine that the terminal is not configured to use the resource or resource pool corresponding to the restriction parameter when the determination result is not a match, or
wherein the processor is configured to determine whether a PLMN to which the terminal belongs matches the PLMN in the configured resource or resource pool and the restriction parameter corresponding to the resource or resource pool; determine that the terminal is configured to use the resource or resource pool corresponding to the restriction parameter when a determination result is a match; and determine that the terminal is not configured to use the resource or resource pool corresponding to the restriction parameter when the determination result is not a match.

9. The terminal according to claim 8,
wherein the scene parameter comprises at least one of a terminal connection state and a terminal control mode,
wherein the terminal connection state comprises at least one of an idle state, an inactive state, and a connected state,
wherein the terminal control mode comprises a network full control mode and a network partial control mode, or
wherein the resource usage restriction parameter comprises at least one of a resource usage time restriction parameter, a resource usage probability restriction parameter, and a resource usage size restriction parameter.

10. The terminal according to claim 8, wherein the processor is configured to randomly obtain a first numerical value, compare the first numerical value with a resource usage probability restriction parameter in the restriction parameter, determine that the terminal is configured to use the resource or resource pool corresponding to the restriction parameter when a comparison result meets a preset condition, and determine that the terminal is not configured to use the resource or resource pool corresponding to the restriction parameter when the comparison result does not meet the preset condition.

11. The terminal according to claim 8, wherein the processor is configured to randomly select a first resource pool from the resource pool as the direct link resource when it is determined that the terminal is configured to use the resource pool corresponding to the restriction parameter, or
wherein the processor is further configured to determine that data transmission is restricted when it is determined according to the restriction parameter that the terminal is not configured to use the resource or resource pool corresponding to the restriction parameter.

12. The terminal according to claim 10, wherein the processor is further configured to randomly obtain a second numerical value, and determine a restricted usage time duration of the resource or resource pool according to the second numerical value and a resource usage time restriction parameter in the restriction parameter.

* * * * *